(12) United States Patent
Barnes et al.

(10) Patent No.: US 11,655,128 B2
(45) Date of Patent: May 23, 2023

(54) WORK AREA INDICATOR

(71) Applicant: Tulsa Winch, Inc., Tulsa, OK (US)

(72) Inventors: Darren Scott Barnes, Tulsa, OK (US);
David M. Berezowski, Tulsa, OK (US);
Michael J. Martell, Tulsa, OK (US);
Haroon A. Khan, Tulsa, OK (US)

(73) Assignee: Tulsa Winch, Inc., Jenks, OK (US)

( * ) Notice: Subject to any disclaimer, the term of this patent is extended or adjusted under 35 U.S.C. 154(b) by 1362 days.

(21) Appl. No.: 15/968,504

(22) Filed: May 1, 2018

(65) Prior Publication Data
US 2018/0319637 A1 Nov. 8, 2018

Related U.S. Application Data

(60) Provisional application No. 62/492,716, filed on May 1, 2017.

(51) Int. Cl.
*B66C 23/00* (2006.01)
*B66C 23/94* (2006.01)
*G01D 5/04* (2006.01)
*B66C 23/84* (2006.01)

(52) U.S. Cl.
CPC ............ *B66C 23/94* (2013.01); *B66C 23/84* (2013.01); *G01D 5/04* (2013.01); *B66C 2700/082* (2013.01)

(58) Field of Classification Search
CPC ... B66C 23/94; B66C 23/84; B66C 2700/082; B66C 13/16; B66C 13/22; B66C 13/32; B66C 13/30; B66C 13/46; B66C 15/045; B66C 15/065; G01D 5/02
See application file for complete search history.

(56) References Cited

U.S. PATENT DOCUMENTS

| 3,452,624 | A | 7/1969 | Lorence |
| 5,957,302 | A | 9/1999 | Douglas |
| 8,164,211 | B2 | 4/2012 | Numajiri |
| 8,348,002 | B2 * | 1/2013 | Checketts ............ B62D 7/026 180/234 |
| 8,550,266 | B2 | 10/2013 | Settlemier et al. |
| 8,567,082 | B2 | 10/2013 | Mecham et al. |
| 2010/0284641 | A1 | 11/2010 | Aida |
| 2011/0291061 | A1 | 12/2011 | Costas |
| 2013/0202234 | A1 | 8/2013 | Noda |

FOREIGN PATENT DOCUMENTS

CN 203756729 8/2014

* cited by examiner

*Primary Examiner* — Emmanuel M Marcelo
(74) *Attorney, Agent, or Firm* — GableGotwals; David G. Woodral

(57) ABSTRACT

A device includes a bevel pinion meshed to a bevel ring in rigid fixation with a pinion gear engaged with a slew ring to control rotation of the slew ring. A rotation sensor provides an electrical output corresponding to a rotational position of an input gear of the rotation sensor. A reduction gearing system interposes the bevel ring and the input gear of the rotation sensor. The gearing reduction system provides a reduction ratio enabling the rotation sensor to determine rotational position of the slew ring.

20 Claims, 7 Drawing Sheets

WORK AREA INDICATOR

CROSS-REFERENCE TO RELATED CASES

This application claims the benefit of U.S. provisional patent application Ser. No. 62/492,716, filed on May 1, 2017, and incorporates such provisional application by reference into this disclosure as if fully set out at this point.

FIELD OF THE INVENTION

This disclosure relates to machine safety devices in general and, more particularly, to a safety device and system for a rotating machine.

BACKGROUND OF THE INVENTION

In utilizing rotating machinery such as hoists, lifts, or cranes, care must be taken to define the safe work area of the device. The work area, which may be defined by a specific arc of a circle within a specific radius of the machine, would be that area that should be reasonably expected by the operator of the machine to remain free of buildings, equipment, and people such that loads can be safely lifted or moved. With the work area defined and sufficiently monitored, the machine operator must also take care that operations are not conducted outside of this defined work area.

Machine operators typically have many factors to consider, such as timing of movement and delivery of loads, making sure loads do not exceed weight ratings, and even consideration of wind with respect to larger systems (e.g., cranes). Visual confirmation that operations are taking place safely and within the defined work area is always important. However, technology can aid in enhancement of the overall safety of the operation and/or provide a backup to an operator.

What is needed is a system and method for addressing the above and related concerns.

SUMMARY OF THE INVENTION

The invention of the present disclosure, in one aspect thereof, comprises a device comprising a bevel pinion meshed to a bevel ring in rigid fixation with a pinion gear engaged with a slew ring to control rotation of the slew ring, a rotation sensor providing an electrical output corresponding to a rotational position of an input gear of the rotation sensor, and a reduction gearing system interposing the bevel ring and the input gear of the rotation sensor. The gearing reduction system provides a reduction ratio enabling the rotation sensor to determine rotational position of the slew ring.

In some embodiments, the rotation sensor reports an absolute position at least within a predetermined rotational limit. The gearing reduction system may comprise multiple stages. A housing may contain at least part of the gearing reduction system and the rotation sensor.

The slew ring may further comprise an inner race rotationally coupled to an outer race. The pinion gear may be meshed to the outer race and the outer race affixed in a constant angular position with respect to a crane boom. The inner race may be affixed in a constant angular position with respect to a base of the crane.

The invention of the present disclosure, in another aspect thereof, comprises a device with a reduction gear set having an input gear interconnected with a portion of a slew ring that is rigidly affixed with respect to a rotational angle of a first portion of a rotating machine. The device includes a rotation encoder providing an electrical signal corresponding to a rotational angle of the rotation encoder. An input to the rotation encoder is meshed to an output of the reduction gear set such that the rotation encoder provides an electrical signal corresponding to a rotation angle of the portion of the rotating machine.

In some embodiments, the device includes a casing containing at least part of the reduction gear set and the rotation encoder. An output may be provided from the casing for reporting the electrical signal from the rotation encoder.

The slew ring may comprise an inner race and outer race, the outer race being rigidly connected to a crane boom comprising the first portion of the rotating machine. The reduction gear set may be rotationally connected to a powered pinion that provides rotational power for rotating the slew ring. An input bevel gear to the reduction gear set may mesh with a bevel ring rigidly affixed to the powered pinion. The powered pinion and bevel ring may provide a reduction stage to the input bevel gear. In some embodiments, the reduction gear set provides at least one additional reduction stage interposing the bevel pinion and the input to the rotation encoder. A reduction ration of at least 3.0 may be provided between the slew ring and the rotation encoder. In some cases, the rotation encoder provides an absolute position of the slew ring across a predetermined angle of rotation of the slew ring.

The invention of the present disclosure, in another aspect thereof, comprises a method including providing reduction gear set interconnected to a slew ring of a rotating machine, providing a rotation encoder connected to the reduction gear set such that the rotation encoder receives as input, a reduced rotation corresponding to the rotation of the slew ring, and generating an electrical output from the rotation encoder corresponding to the rotation of the slew ring.

The method may include connecting the reduction gear set to a powered pinion gear that rotates the slew ring and/or at least partially isolating the reduction gear set in a sealed casing.

DETAILED DESCRIPTION OF THE PREFERRED EMBODIMENTS

Figure 1:
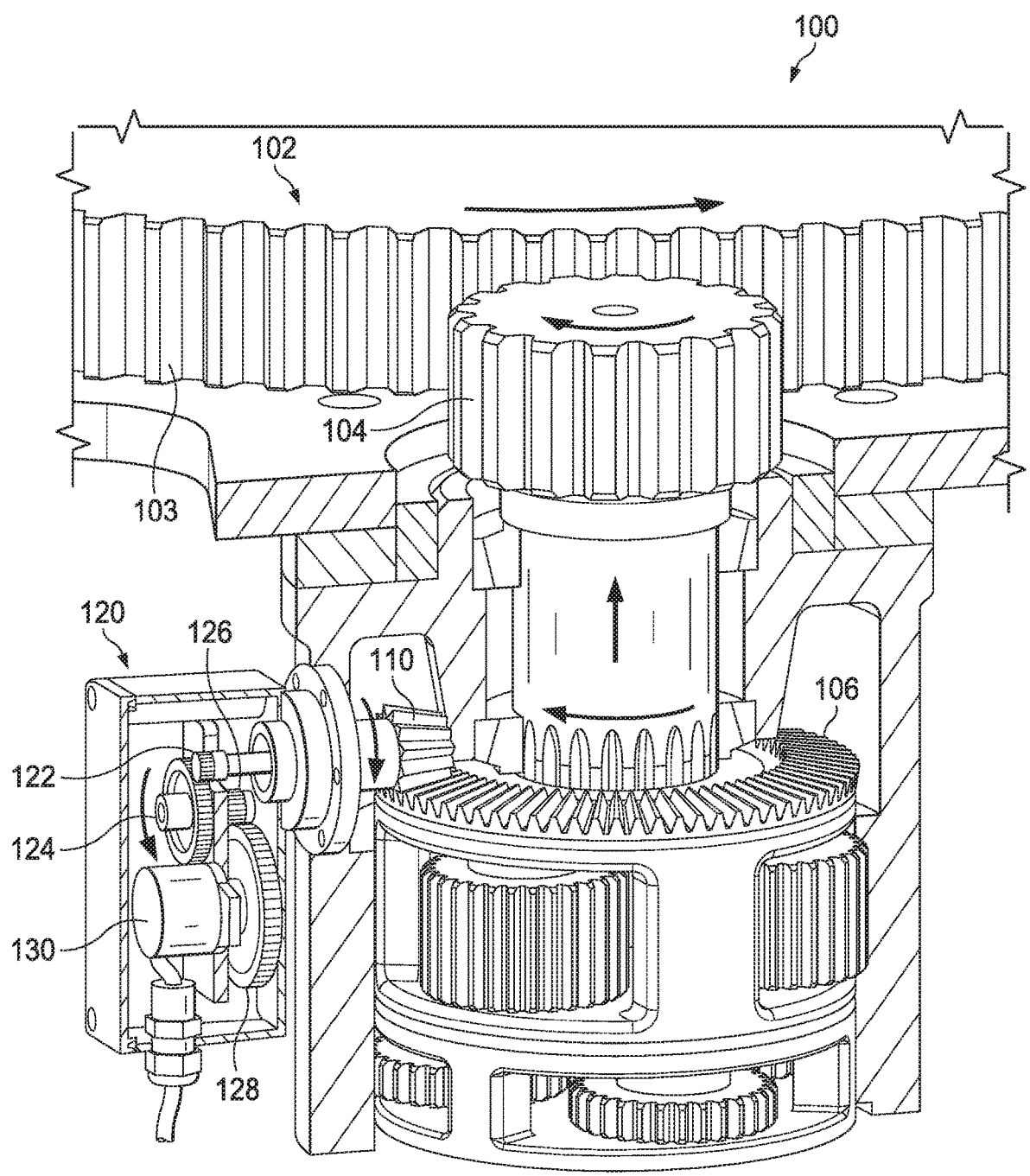
FIG. 1 is a partial cutaway view and parts list of a work area indicator according to aspects of the present disclosure.
Figure 5:
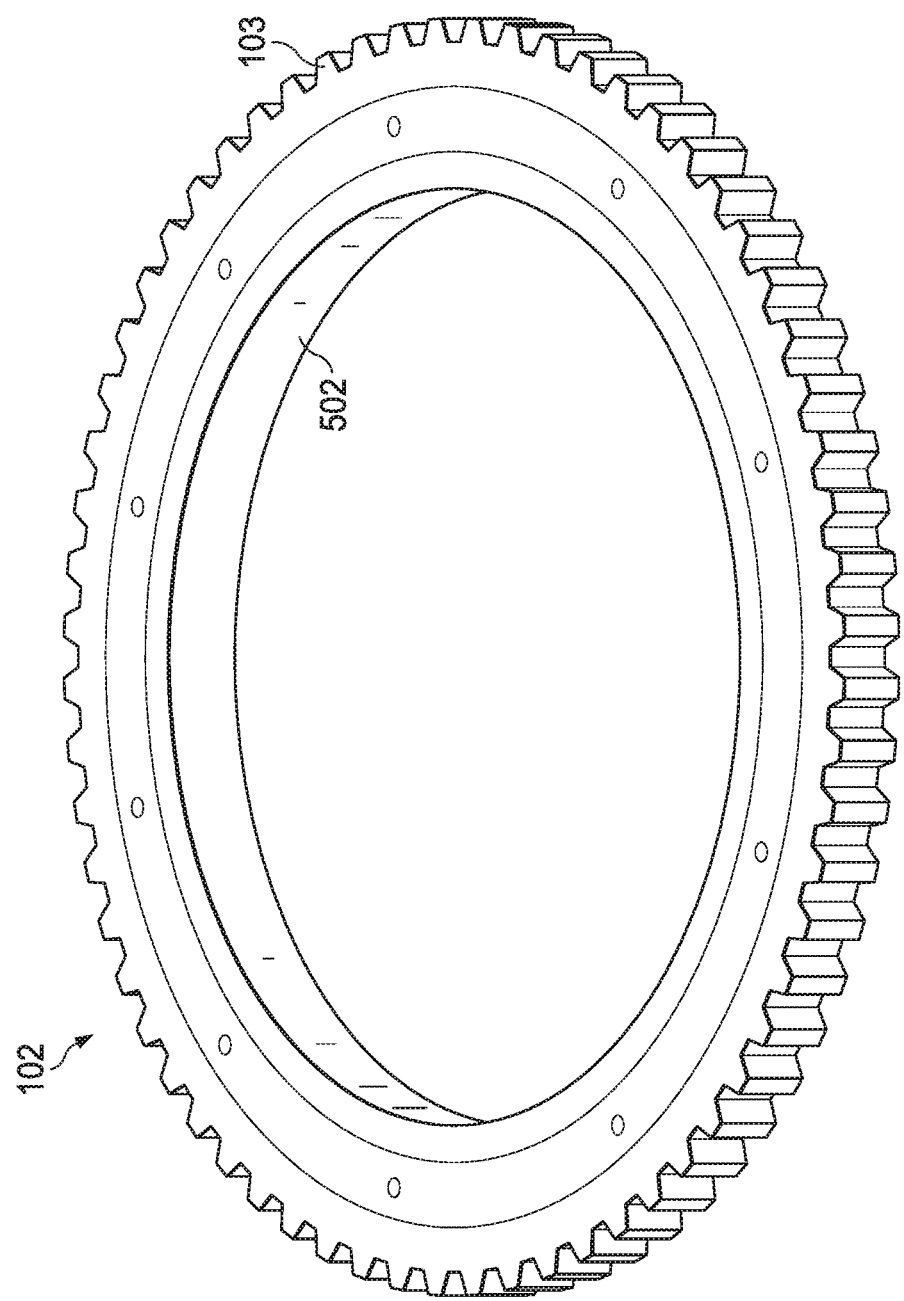
FIG. 5 is a perspective view of a slew ring.

Referring now to FIG. 1, a partial cutaway view of a work area indicator 100 according to aspects of the present disclosure is shown. A slew ring 102 may be attached to a portion of a rotating machine such as a crane or lift. The slew ring 102 is a component of the present disclosure around which other components may operate. It may therefore be helpful to thoroughly understand its geometry and location. FIG. 5 illustrates a location of slew ring 102 as a component of an exemplary crane 400. The crane 400 may articulate or rotate between a base 402 or lower portion and a cab or upper portion 404. A boom 406 may be affixed to the upper portion 404 to lift or move loads (along with other components as are known in the art). Thus, crane 400 may be considered a machine that is rotatable between two portions on slew ring 102. It should be understood that the crane 400 is only exemplary. Other types of cranes or rotating machines may employ a slew ring 102 (or multiple slew rings).

Figure 6:
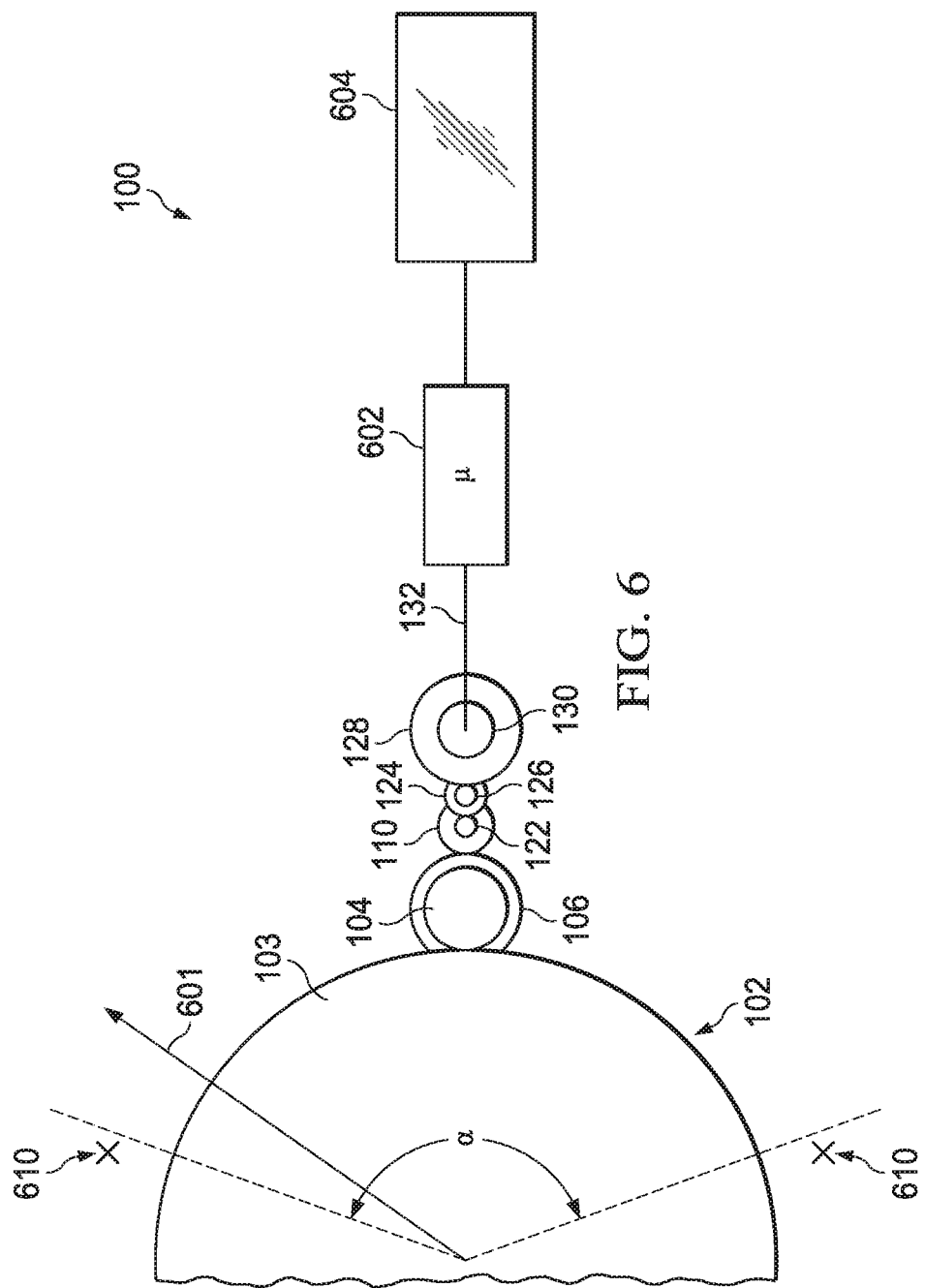
FIG. 6 is a schematic representation of one embodiment of a work area indicator according to aspects of the present disclosure.

FIG. 6 illustrates a perspective view of the slew ring 102 in isolation, for clarity. The slew ring 102 may comprise an outer race 103 that can slip or rotate with respect to an inner race 502. The slew ring 102 may be sealed and may contain an internal bearing or bearings (not shown) allowing for low resistance to turning or rotation even under heavy load. Bushing or journal bearings may be used but bearings with rolling elements (e.g., ball bearings) may be more useful or wear resistant in some applications.

In one configuration, the inner race 502 may be rigidly affixed to one portion of a machine (e.g., lower portion 402 of crane 400) while the outer race 103 may be rigidly affixed to another portion of the machine (e.g., upper portion 404 or crane 400). By engagement of a drive mechanism, the respective portions of the machine may be smoothly rotated relative to one another. As shown in FIG. 5, the outer race 103 is toothed as a gear ring. It should be understood that the gear teeth may be an integral part of the outer race 103, or may be a separate component or components that are serviceable for wear, replacement, etc.

Referring now back to FIG. 1, the outer race 103 of the slew ring 102 may be rotated by a pinion gear 104 that is powered by a gear train or other mechanism affixed to rotary power (e.g., an electric or hydraulic motor, not shown). In the present example, a bevel gear 106 is affixed to the gear train in such a way that it rotates one revolution per revolution of the pinion gear 104. In the present example, the outer race 103 provides 117 teeth while the pinion gear 104 provides 15 teeth giving a driven-to-driving ratio of 7.8. This may be considered a first reduction (of 7.8 ratio in the present embodiment).

The bevel gear 106 is not responsible for rotation of the pinion gear 104 but rotates with it one-to-one. A rotation sensor 120 may affix to the gear train or elsewhere such that rotation of the bevel gear 106 can be sensed. This can be accomplished via a tooth counter apparatus or, as shown, with an absolute encoder system. The rotation of the bevel gear 106 causes rotation of a bevel pinion 110 affixed to an output gear 122. The bevel gear 106 provides 72 teeth while the bevel pinion provides 12 teeth resulting in a ratio of 6. This may be considered a second reduction (of 6 ratio in the present embodiment).

The bevel pinion 110 drives a reduction gear train within a casing 120 external to the drive train of the slew ring 102. A 12-tooth gear 122 within the casing 120 drives a 40-tooth gear 124 resulting in a reduction ratio of 0.3. This may be considered a third reduction or first overdrive (of 0.3 ratio in the present embodiment). The 40-tooth gear 124 is affixed to a 16-tooth gear 126 driving a 64-tooth gear 128 affixed to the input shaft of a rotary encoder 130. The reduction ratio of the gears 126, 128 is 0.25. This may be considered a fourth reduction (or second overdrive).

In the present embodiment, multiplication of the first, second, third, and fourth reduction gives a final reduction ratio between rotation of the slew ring 102 and the rotary encoder of 3.51. Therefore, the encoder 130 rotates 3.51 turns per rotation of the slew ring 102 (or the slew ring outer race 103). It will be appreciated that other reductions and overdrives may be used, and that more or fewer stages or ratios may be employed. In the present embodiments, the first, second, third, and fourth reductions allow the majority of the system 100 to be enclosed within the casing 120. It also allows the relatively large and heavy outer race 103 of the slew ring 102 to be completely monitored for rotational position with a compact gear train and sensor.

The encoder 130 may be an absolute encoder that provides a binary output string dependent upon the position of the input shaft to the encoder. In some embodiments, the encoder 130 is an RSM-2832-214 series encoder available from Novotechnik. In one embodiment, the encoder 130 is capable of measuring up to 14 turns without power. In other words, even unpowered, the encoder 130 can track up to 14 rotations of the input shaft and correctly report its position when repowered. This may be considered as 7 turns counterclockwise or 7 turns clockwise. Seven turns of the encoder 130 is 1.99 turns of the slew ring 102. Thus, the system 100 of the present disclosure, in various embodiments, can track nearly 2 revolutions either direction of the slew ring 102 even if the slew ring 102 is rotated when the encoder 130 is in an unpowered state. The output of the encoder 130 is utilized to determine the boom position or other rotational position of the system into which the work area indicator 100 is installed.

Where, the encoder 130 has been turned fewer than 14 compete rotations, the slew ring may turn up to 3.98 turns. Within these relatively large limits, the encode is considered an absolute encoder. In other words, the position can be reported in an absolute sense rather than with respect to an arbitrary starting point. Similarly, this allows the system 100 to be considered an absolute position determination system with respect to the boom angle (or other rotational parameter of the machine into which it is installed). Normally, when a crane or other heavy machinery is unpowered, it is secured against unacceptable movement that may allow the boom (or other monitored component) to contact obstacles when not powered. Therefore, any loss of absolute positioning ability that may result if the boom or other component is rotated an excessive number of times is largely a concern only in a theoratical sense.

Figure 2A:
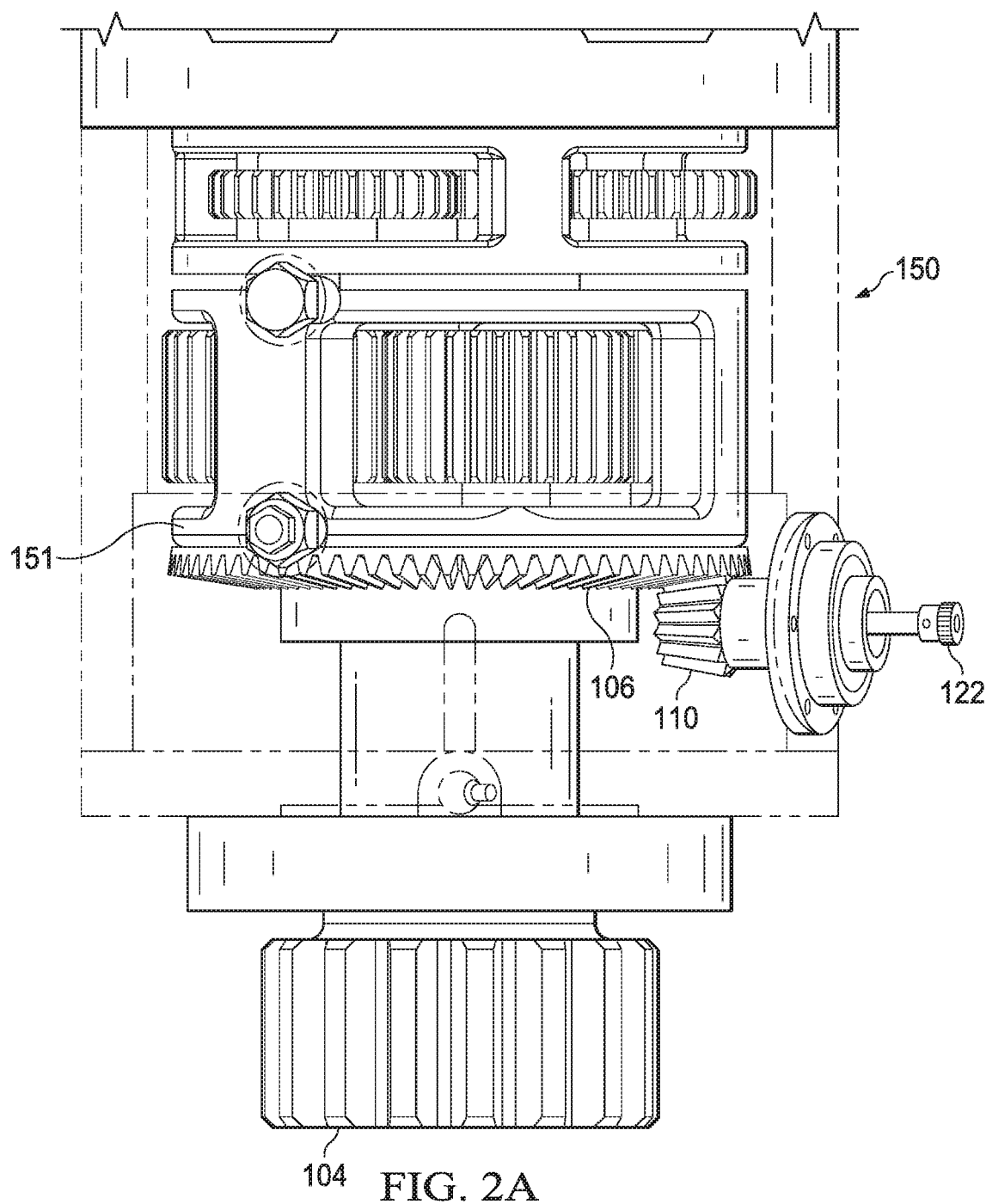
FIG. 2A is partial cutaway side view a gear box for use as part of a work area indicator according to aspects of the present disclosure.
Figure 2B:
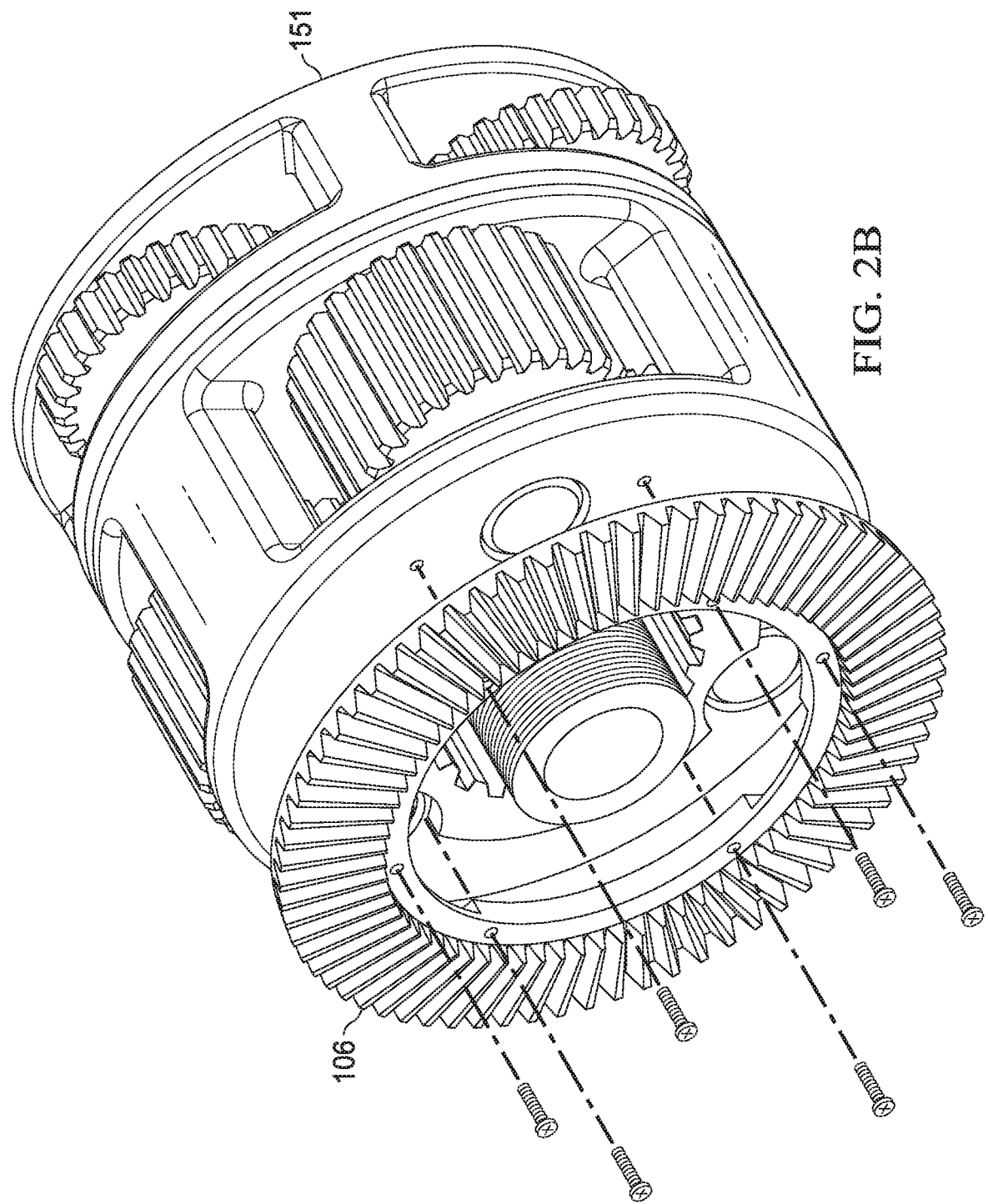
FIG. 2B is a perspective view of a gear assembly subcomponent of the gear box of FIG. 2A.

Referring now to FIG. 2A is partial cutaway side view of a gear box 150 (also shown in FIG. 1) for use as part of a work area indicator according to aspects of the present disclosure is shown. Here the pinion gear 104 is shown separate from the outer race 103. The position of the bevel pinion 110 substantially perpendicular to the pinion gear 104 and interacting with the pinion gear 104 via the bevel gear 106 can also be seen. As best seen in FIG. 2B, the bevel gear affixes rigidly to a planet carrier 151 as a component of the gear box 150. The planet carrier 151 rotates in lock step with the pinion gear 104.

Figure 3:
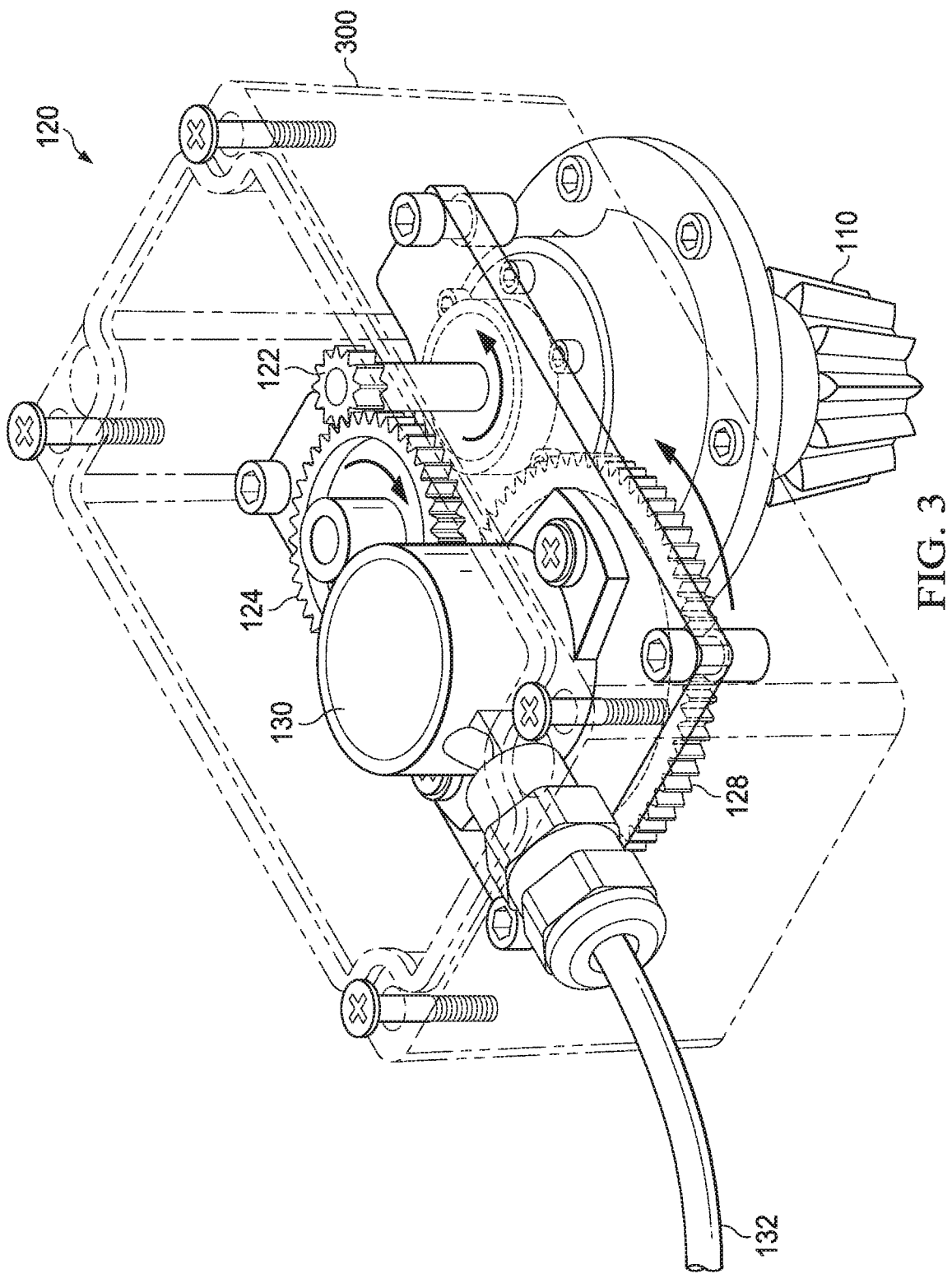
FIG. 3 is a closeup partial transparent perspective view of part of the gearing reduction mechanism of a work area indicator according to aspects of the present disclosure.
Figure 4:
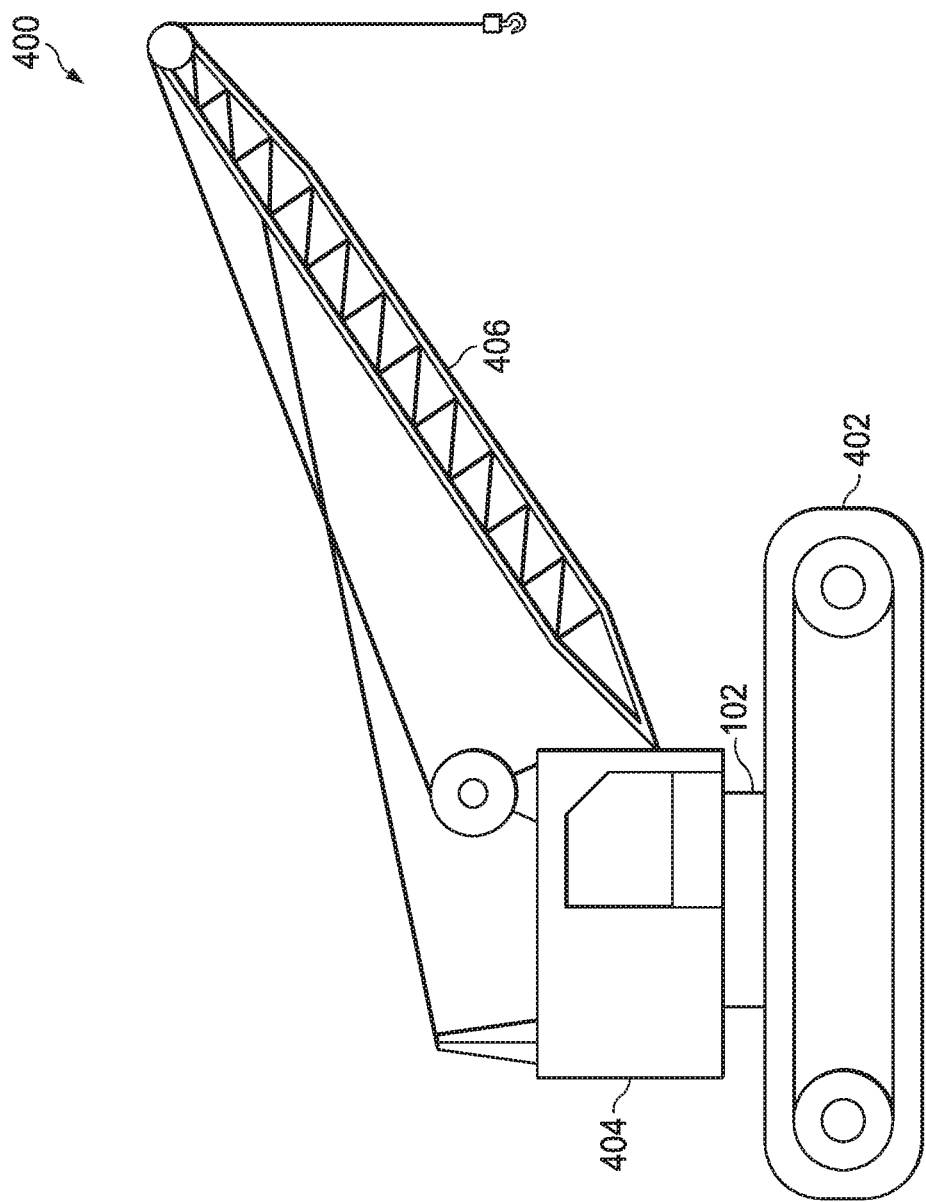
FIG. 4 is simplified side view of a crane employing a work area indicator according to aspects of the present disclosure.

Referring now to FIG. 3 is a closeup partial transparent perspective view of part of the gearing reduction mechanism of a work area indicator according to aspects of the present disclosure is shown. The case 120 may comprise a metal, an impact resistant polymer, or another suitable material. The case 120 may be sealed against contamination and admits the 12-tooth gear 122 affixed to the bevel gear 106 as an input. Gears 122, 124, 126, and 128 operate within the casing 120 as previously described. The encoder 130 is located within the casing 120 as well. An output lead 132 exits the casing 120 and may be provided to a computer or electronic controller for reporting its rotational position via a binary string. The data provided on the output lead 132 is used to calculate the position of the boom or other mechanism to ensure it is within the defined work area. If not, an alarm or other warning may be provided to an operator.

Referring now to FIG. 6 a schematic representation of one embodiment of a work area indicator 100 according to aspects of the present disclosure is shown. FIG. 6 is not to scale and certain details (e.g., gear teeth) are not shown for clarity. Here the outer race 103 of the slew ring 102 is configured in an installation to be rigidly affixed to boom (e.g., boom 406 of crane 400) such that movement of the outer race 103 corresponds directly to the angular position 601 of the boom (viewed from above). For illustrative purposes, two obstacles 610 are shown as limiting to the maximum boom rotation angle α.

Rotation of the outer race 103, and therefore the angular position 601 of the boom may be achieved by rotation of the pinion 104 as a component of a powered gear train as previously described. Rotationally linked to the pinion 104 is bevel gear 106, which meshes with bevel pinion 110. Bevel pinion 110 is rigidly affixed to gear 122, which drives gear 124. Gear 124 is rigidly affixed to gear 126, which drives gear 128, which is rigidly affixed to the encoder 130.

Unless otherwise specified, for purposes of the present disclosure, when gears or components are said to be meshed they should be considered to be directly mechanically connected (e.g., tooth to tooth interconnection). However, this does not mean that lubricants, protectants, and other substances cannot be present on the gears or components. On the other hand, rigid fixation should be taken to mean that the components rigidly affixed to one another do not normally rotate or translate with respect to one another, or that they do not rotate or translate with respect to the angle spoken of. For example, the rotational position of a boom may be rigidly affixed with respect to part of a slew ring. This means that the boom and slew ring would maintain the same angular orientation from above, but the boom might raise, lower, extend, etc.

Returning to FIG. 6, output from the encoder 130 may be a binary string or other electrical signal representative of the position measured by the encoder 130. Based upon the mathematics of the reduction gearing previous described, the angular position of the boom 406 can be accurately determined. As described above, the angular position may be determinable even if the boom 406 rotates when the encoder 130 is not powered.

A microcontroller 602 may read or accept the output data from the encoder 130. In some embodiments, the microcontroller 602 may comprise part of a general-purpose computer. The 602 may be tasked with multiple functions and may be a component of an on-board control computer for a crane or other machine. In other embodiments, the microcontroller is a component limited to interaction with the encoder 130 and reporting of the data obtained therefrom.

FIG. 6 illustrates a display panel 604 that may display information corresponding to the determined boom angle. Other input output devices (not shown) may be included as well. Display panel 604 and other I/O devices may be located in a position where they are useful to an operator of the crane or other machine into which the work area indicator system 100 is installed.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

What is claimed is:

1. A device comprising:
   a bevel pinion meshed to a bevel ring in rigid fixation with a pinion gear engaged with a slew ring to control rotation of the slew ring;
   a rotation sensor providing an electrical output corresponding to a rotational position of an input gear of the rotation sensor; and
   a reduction gearing system interposing the bevel ring and the input gear of the rotation sensor;
   wherein the gearing reduction system provides a reduction ratio enabling the rotation sensor to determine rotational position of the slew ring.

2. The device of claim 1, wherein the rotation sensor reports an absolute position at least within a predetermined rotational limit.

3. The device of claim 1, wherein the gearing reduction system comprises multiple stages.

4. The device of claim 1, further comprising a housing containing at least part of the gearing reduction system and the rotation sensor.

5. The device of claim 1, wherein the slew ring further comprises an inner race rotationally coupled to an outer race.

6. The device of claim 5, wherein the pinion gear is meshed to the outer race and the outer race is affixed in a constant angular position with respect to a crane boom.

7. The device of claim 6, wherein the inner race is affixed in a constant angular position with respect to a base of the crane.

8. A device comprising:
   a reduction gear set having an input gear interconnected with a portion of a slew ring that is rigidly affixed with respect to a rotational angle of a first portion of a rotating machine; and
   a rotation encoder providing an electrical signal corresponding to a rotational angle of the rotation encoder;
   wherein an input to the rotation encoder is meshed to an output of the reduction gear set such that the rotation encoder provides an electrical signal corresponding to a rotation angle of the portion of the rotating machine.

9. The device of claim 8, further comprising a casing containing at least part of the reduction gear set and the rotation encoder.

10. The device of claim 9, further comprising an output from the casing for reporting the electrical signal from the rotation encoder.

11. The device of claim 8, wherein the slew ring comprises an inner race and outer race, the outer race being rigidly connected to a crane boom comprising the first portion of the rotating machine.

12. The device of claim 8, wherein the reduction gear set is rotationally connected to a powered pinion that provides rotational power for rotating the slew ring.

13. The device of claim 12, wherein an input bevel gear to the reduction gear set meshes with a bevel ring rigidly affixed to the powered pinion.

14. The device of claim 13, wherein the powered pinion and bevel ring provide a reduction stage to the input bevel gear.

15. The device of claim 14, wherein the reduction gear set provides at least one additional reduction stage interposing the powered pinion and the input to the rotation encoder.

16. The device of claim 15, wherein a reduction of at least 3.0 is provided between the slew ring and the rotation encoder.

17. The device of claim 16, wherein the rotation encoder provides an absolute position of the slew ring across a predetermined angle of rotation of the slew ring.

18. A method comprising:
   providing a reduction gear set interconnected to a slew ring of a rotating machine;
   providing a rotation encoder connected to the reduction gear set such that the rotation encoder receives as input, a reduced rotation corresponding to the rotation of the slew ring;
   generating an electrical output from the rotation encoder corresponding to the rotation of the slew ring.

19. The method of claim 18, further comprising connecting the reduction gear set to a powered pinion gear that rotates the slew ring.

20. The method of claim 19, further comprising at least partially isolating the reduction gear set in a sealed casing.

* * * * *